May 29, 1951 W. Y. LEWIS 2,555,043
WASTE HEAT OR SURPLUS HEAT BOILER
Filed Aug. 17, 1945 4 Sheets-Sheet 1

Inventor
W. Y. Lewis
By Glascock Downing Seko
Attys

May 29, 1951 W. Y. LEWIS 2,555,043
WASTE HEAT OR SURPLUS HEAT BOILER
Filed Aug. 17, 1945 4 Sheets-Sheet 3

Inventor
W. Y. Lewis
By Hanock Downingfield
Attys.

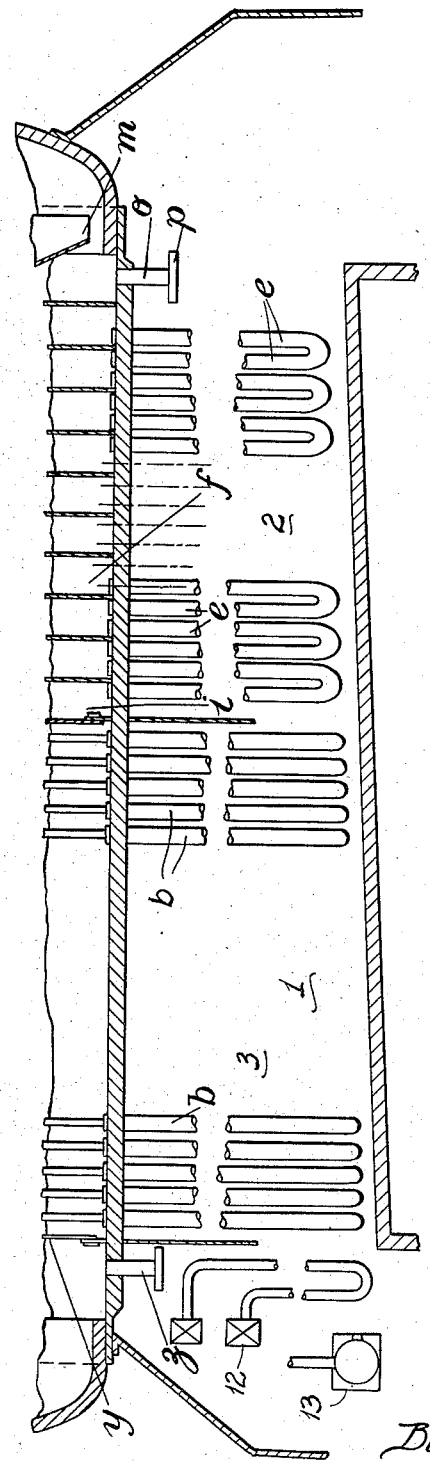
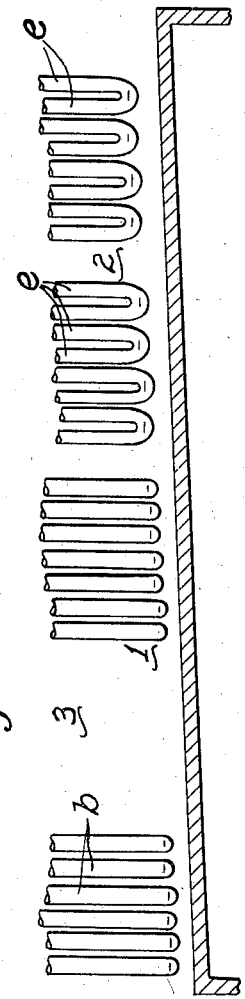

Patented May 29, 1951

2,555,043

UNITED STATES PATENT OFFICE 2,555,043

WASTE HEAT OR SURPLUS HEAT BOILER

William Yorath Lewis, St. John's Wood, London, England, assignor to Yorath Lewis Boilers Limited, London County, England Application August 17, 1945, Serial No. 610,949
In Great Britain July 18, 1944

Section 1, Public Law 690, August 8, 1946
Patent expires July 18, 1964

2 Claims. (Cl. 122—7)

This invention relates to waste heat or surplus heat boilers, for example, for utilising surplus heat contained in exit gases from steel smelting furnaces, soaking pits, reheating furnaces, steelworks, gaswork retorts, Diesel engine exhaust, etc.

The invention has for its object to provide improved forms of such boilers.

The invention consists in a surplus heat boiler incorporating features as set forth in the claims appendant hereto.

Referring to the accompanying diagrammatic drawings—

Figure 5 is a view similar to Figure 1 with parts broken away showing the modification, and Figure 6 is a view similar to Figure 1 with parts broken away showing a further modification.

Similar reference characters indicate corresponding parts throughout the several views of the drawings.

Figure 1:
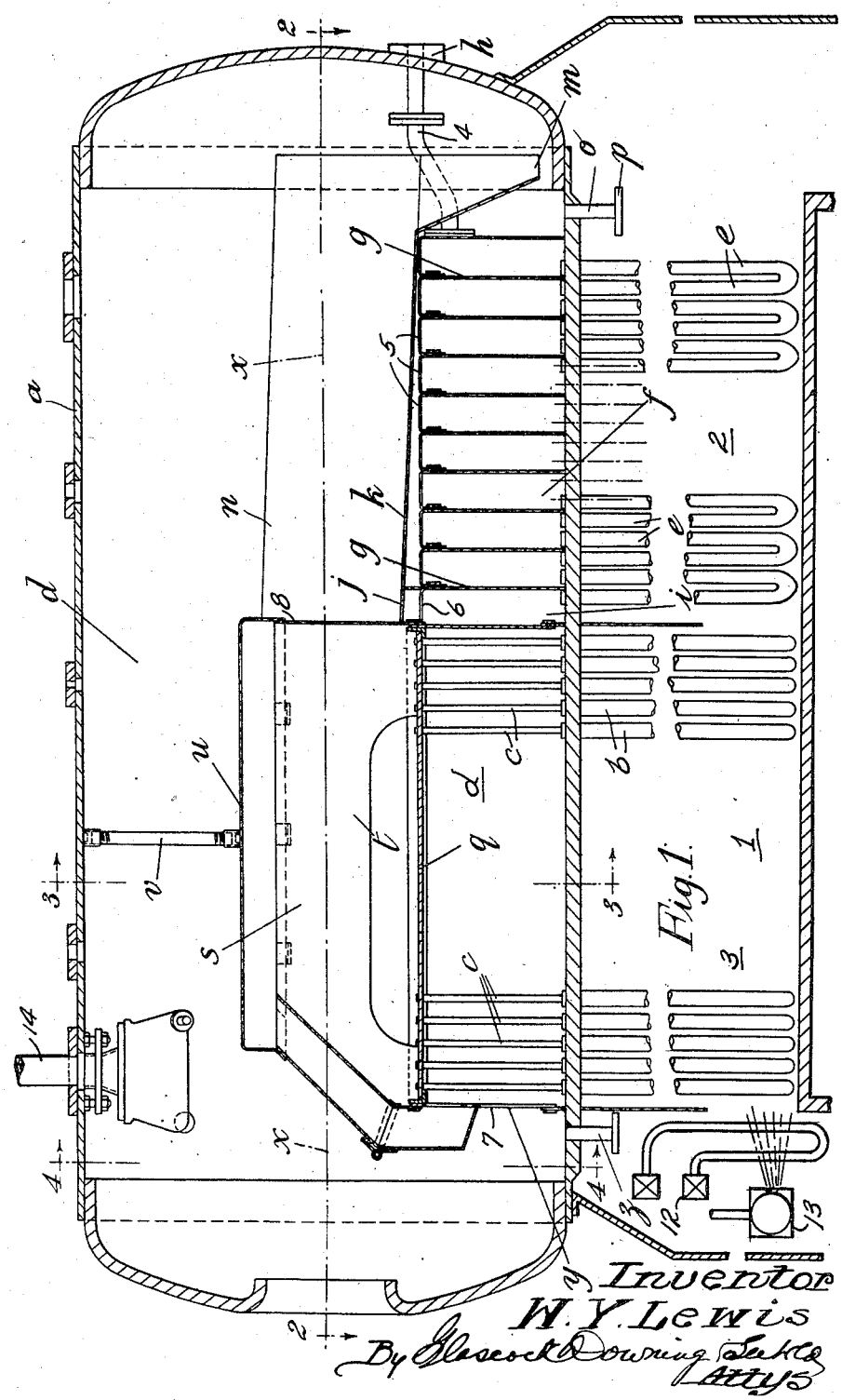
Figure 1 is a vertical longitudinal sectional view of a convenient construction of waste heat boiler embodying the present invention.
Figure 2:
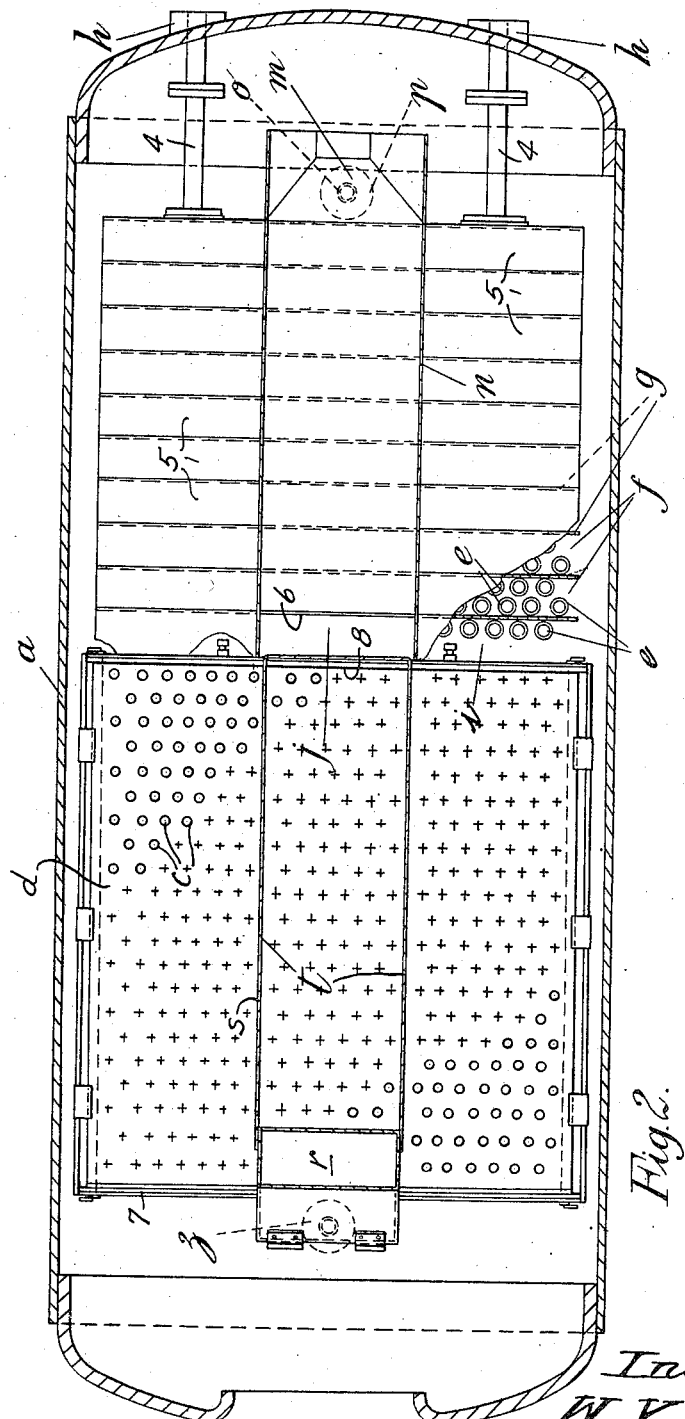
Figure 2 is a sectional plan thereof on the line 2—2.
Figure 4:
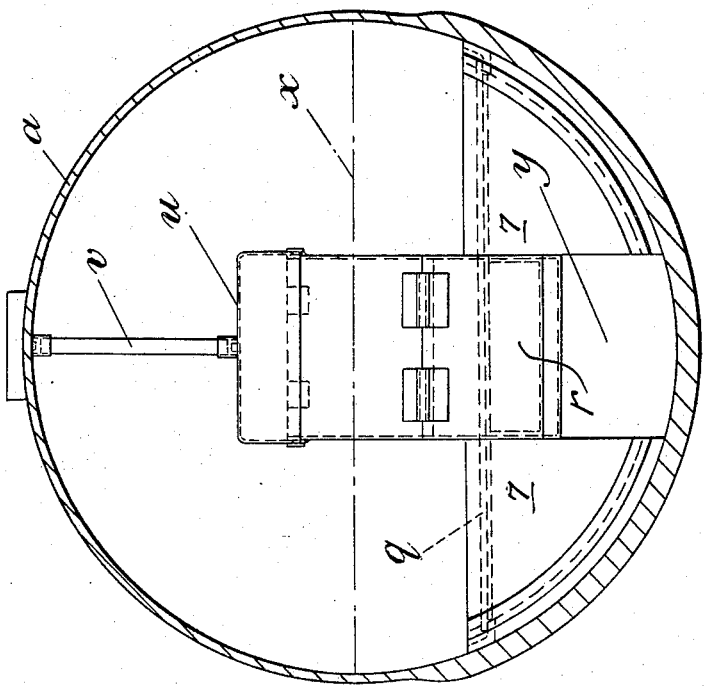
Figure 4 is a vertical cross-sectional view on the line 4—4 of Figure 1.
Figure 3:
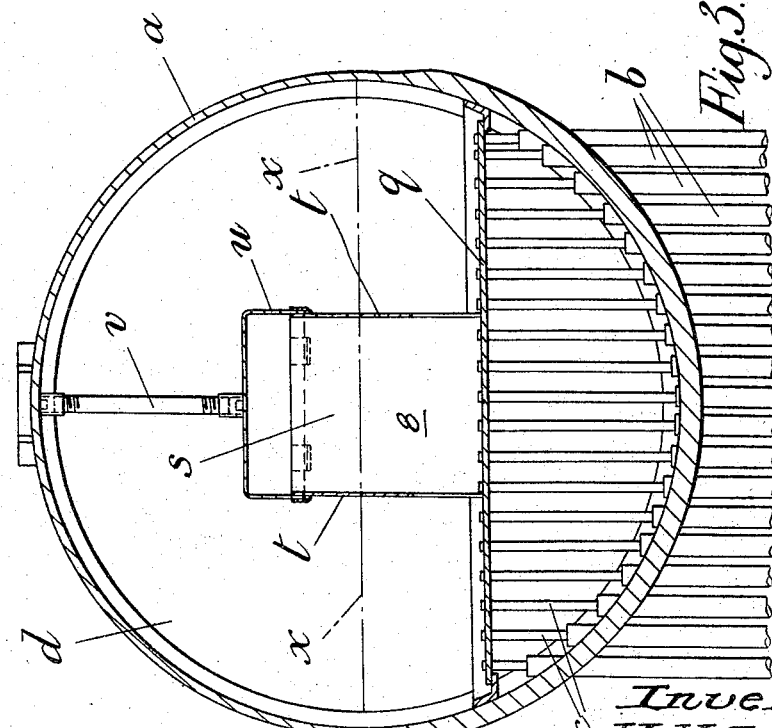
Figure 3 is a vertical cross-sectional view on the line 3—3 of Figure 1.

Referring to Figs. 1–4 of the drawings, a boiler of this invention is shown to comprise a cylindrical drum $a$. This is mounted in horizontal position extending lengthwise of a horizontal passage or flue $l$ through which hot waste gases flow in the direction of the length of the drum from left to right as illustrated in Fig. 1. The boiler, in effect, is divided into two sections; an economizer or preheating and precipitation section 2, which is also referred to as a sensible heating section, and a steam generator or latent heating section 3. The sensible heating section occupies that half of the length of the drum which is located toward the cool end of the boiler and the latent heating section occupies the other half of the drum located toward the hot end of the boiler.

Boiler feed water enters the drum $a$ through inlets $h$ in the end of the drum at the flue exit end and flows through pipes 4 to the first of a longitudinal series of compartments $f$ in the lower part of the drum. The compartments $f$ are formed by a series of transverse vertical partitions or plates $g$ extending from side to side of the drum and having horizontal flange portions 5 at their upper edges which constitute the top walls of the compartments. The first compartment $f$ (the compartment of the series nearest the flue exit end) is in communication with the second compartment through a first transverse row of double-legged or U-shaped water tubes $e$ having their inlet ends communicating through the wall of the drum with the first compartment and their outlet ends communicating through the wall of the drum with a second compartment. The second compartment is in communication with the third compartment through a second row of double-legged or U-shaped water tubes $e$ having their inlet ends communicating through the wall of the drum with the second compartment and their outlet ends communicating through the wall of the drum with the third compartment. The remaining compartments are similarly connected by additional rows of double-legged water tubes $e$, the arrangement being such that feed water enters the first compartment $f$, flows downward, forward and upward through the first row of water tubes $e$ to the second compartment, then flows downward, forward and upward through the second row of water tubes $e$ to the third compartment, and so on to the last compartment $i$ of the series. The water tubes $e$ extend down into the flue $l$ and, as illustrated in Fig. 1, are all of the same length and arranged in echelon. It will be seen that water flowing through the water tubes $e$ flows in the direction opposite to the flow of the hot gases in the flue.

Water flows out of the final compartment $i$ of the series through a central opening 6 in the top of the compartment and thence flows through an opening $j$ in the rearward end of a precipitation trough having a bottom $k$ sloping downward toward the forward end of the drum and vertical sides $n$. The trough has a discharge outlet $m$ for discharging sludge to the bottom of the drum adjacent a blow-down outlet $o$ through which sludge may be ejected under control of a cock (not shown) fitted to a flange $p$ on the outlet $o$. The flow of feed water is controlled to maintain the drum $a$ approximately half full of water, the approximate normal water level being shown by the line $x$.

In the latent heating section of the boiler, within the drum $a$, is a submerged ebullition chamber $d$. This is defined by a horizontal partition $q$, the space under the partition being closed at one end by the wall of the final feed water compartment $i$ and partially closed at its other end by a vertical wall 7 spaced from the adjacent end of the drum. In the lower central part of the wall 7 is an opening $y$. Above the chamber $d$ is a steam chamber $s$. This is defined by transversely spaced longitudinal vertical side walls $t$ extending up from the horizontal partition $q$ to a height above the normal water level, a transverse vertical end wall 8, a duct $r$ and a cover $u$. The duct $r$ forms an end wall closing the end of the steam chamber $s$ and leads from the upper part of chamber $d$ to a point within the chamber $s$ above the normal water level, being directed to discharge steam having water entrained therein against the cover $u$. The latter is braced by a stay $v$ extending down from the top of the drum. In the cover $u$ is an outlet aperture $w$ for escape of steam from the steam chamber. Below the normal water level, the steam chamber side walls have openings 10 for entry of water. At $z$ is shown a blow-down outlet adjacent the opening $y$ for the chamber $d$.

A set of latent heating water tubes is provided having inlets opening through the partition $q$ and outlets opening through the wall of the drum $a$ in communication with chamber $d$. As shown, each latent heating water tube consists of an outer single-legged tube $b$ and an inner so-called Field tube $c$. Each outer tube $b$ communicates at its upper open end with the chamber $d$ through the wall of the drum $a$ and is closed at its lower end. Each Field tube $c$ opens at its upper end through the partition $q$ and extends down through the chamber $d$ and into its respective outer tube $b$ nearly to the lower closed end of the tube $b$. The Field tubes are open at their lower ends. The latent heating water tubes extend down into the flue and, as illustrated, are arranged in echelon. As shown in Fig. 1, all the latent heating tubes are of the same length.

The sensible heating water tubes $e$ and the latent heating water tubes $b$ extend down from the bottom of the drum into the flue I so as to be in heat-exchange relation with respect to the hot waste gases flowing through the flue. The latter may have walls of refractory material, as will be readily understood. It will be seen that the waste gases flow first through the spaces between the latent heating tubes $b$ and first give up heat to these tubes, and then flow through the spaces between the sensible heating tubes $e$. It will also be seen that the feed water flows through the tubes $e$ in a direction contra to the direction of flow of the hot waste gases so that the feed water flows in the direction from the coolest end toward the hottest end of the flue. A superheater 12 may be located in the hot end of the flue, ahead of the latent heating tubes $b$. If desired, a soot blower 13 may also be provided in the flue.

In operation, feed water flows through the sensible heating water tubes $e$ and the compartments $f$ from the cool end toward the hot end of the flue I into the last compartment $i$, and thence out through openings 6 and $j$ and down the trough $k$—$n$. Sludge liberated by heating in the sensible heating section is precipitated in the trough, and is washed down the trough, discharging at $m$. The sludge may be blown out through outlet $o$. The normal water level being maintained above the horizontal partition $q$, water flows down through the Field tubes $c$ into the outer tubes $b$, and steam and water rise in the tubes $b$ around the inner tubes $c$ into the chamber $d$. Steam with water entrained therein blows off from the chamber $d$ through the duct $r$ into the space in chamber $s$ above the water level, being directed against the cover $u$ to effect separation of entrained water from the steam. Dry steam escapes through the opening $w$ into the space in the drum $a$ above the water in the drum and exits from the drum through an outlet 14.

Thus, there is provided, in a single drum, a combination preheater or sensible heating section and a precipitation section together with a latent heating section for steaming, adapted for efficient utilization of waste heat.

In the above-described boiler, the water tubes are all of equal length. It is contemplated that the length of the tubes may progressively diminish from the hot end to the cool end of the flue so that the latter may be of progressively reduced cross-section, thereby to compensate for the progressive reduction in volume of the waste gases as they give up heat to the water in the water tubes and cool in flowing through the flue. This is illustrated in Fig. 5, wherein the length of the tubes uniformly decreases in the direction of flow of the waste gases. Reduction of the length of the tubes may be effected in steps, instead of uniformly, as illustrated in Fig. 6. It will be understood that, in either case, the overall transverse cross-sectional area taken up by the tubes decreases in the direction from the hot to the cool end of the drum.

The water tubes may be arranged one directly behind another in the general direction of flow of the waste gases, instead of being arranged in echelon.

In view of the above, it will be seen that the several objects of the invention are achieved and other advantageous results attained.

As many changes could be made in the above construction without departing from the scope of the invention, it is intended that all matter contained in the above description or shown in the accompanying drawings shall be interpreted as illustrative and not in a limiting sense.

I claim:

1. A steam boiler, particularly for utilizing waste or surplus heat, comprising a steam and water drum adapted to be disposed horizontally with respect to a flue through which hot gases flow, with the arrangement such that gases flow in the direction of the length of the drum from one end of the drum to the other, a set of sensible heating water tubes extending down from the bottom portion of the drum to extend into the flue located toward the said other end of the drum, said sensible heating tubes being arranged for flow therethrough of feed water supplied to the boiler in the opposite direction to the flow of gases in the flue, an ebullition chamber in the lower part of the drum located toward its said one end, a plurality of latent heating water tubes extending down from the bottom of the drum to extend into the flue opening at one end through the top of the chamber and at the other end through the wall of the drum to the interior of the chamber, a steam chamber above the ebullition chamber having an outlet in its top to the interior of the drum, and a duct leading from the ebullition chamber into the steam chamber at a point above the normal level of water in the drum, said steam chamber having an opening below the normal level of water in the boiler.

2. A steam boiler, particularly for utilizing waste or surplus heat, comprising a steam and water drum adapted to be disposed horizontally with respect to a flue through which hot gases flow, with the arrangement such that gases flow in the direction of the length of the drum from one end of the drum to the other, a longitudinal series of compartments in the lower part of the drum located toward its said other end, a feed water inlet leading to the compartment nearest said other end of the drum, an outlet to the interior of the drum from the compartment farthest from said other end of the drum, a set of double-legged sensible heating water tubes arranged in transverse rows extending down from the bottom portion of the drum to extend into the flue located toward the said other end of the drum, the tubes of each row having their respective ends in communication with successive compartments for flow of feed water through successive rows of tubes and compartments in the opposite direction to the flow of gases in the flue, an ebullition chamber in the lower part of the drum located toward its said one end, a plurality of outer latent heating water tubes extending down from the bottom of the drum to extend into the flue closed at their lower ends and opening at their upper ends to the interior of the chamber, a plurality of inner tubes opening at their upper ends through the top of the chamber and extending down through the chamber into the outer tubes, a steam chamber above the ebullition chamber having an outlet in its top to the interior of the drum, and a duct leading from the ebullition chamber into the steam chamber at a point above the normal level of water in the drum, said steam chamber having an opening below the normal level of water in the boiler.

WILLIAM YORATH LEWIS.

REFERENCES CITED

The following references are of record in the file of this patent:

UNITED STATES PATENTS

| Number | Name | Date |
|---|---|---|
| 232,773 | Stevens | Sept. 28, 1880 |
| 281,946 | Thompson | July 24, 1883 |
| 1,839,125 | Smith | Dec. 29, 1931 |
| 2,008,076 | Lewis | July 16, 1935 |
| 2,358,358 | Stromquist | Sept. 19, 1944 |

FOREIGN PATENTS

| Number | Country | Date |
|---|---|---|
| 152 | Great Britain | 1909 |